UNITED STATES PATENT OFFICE.

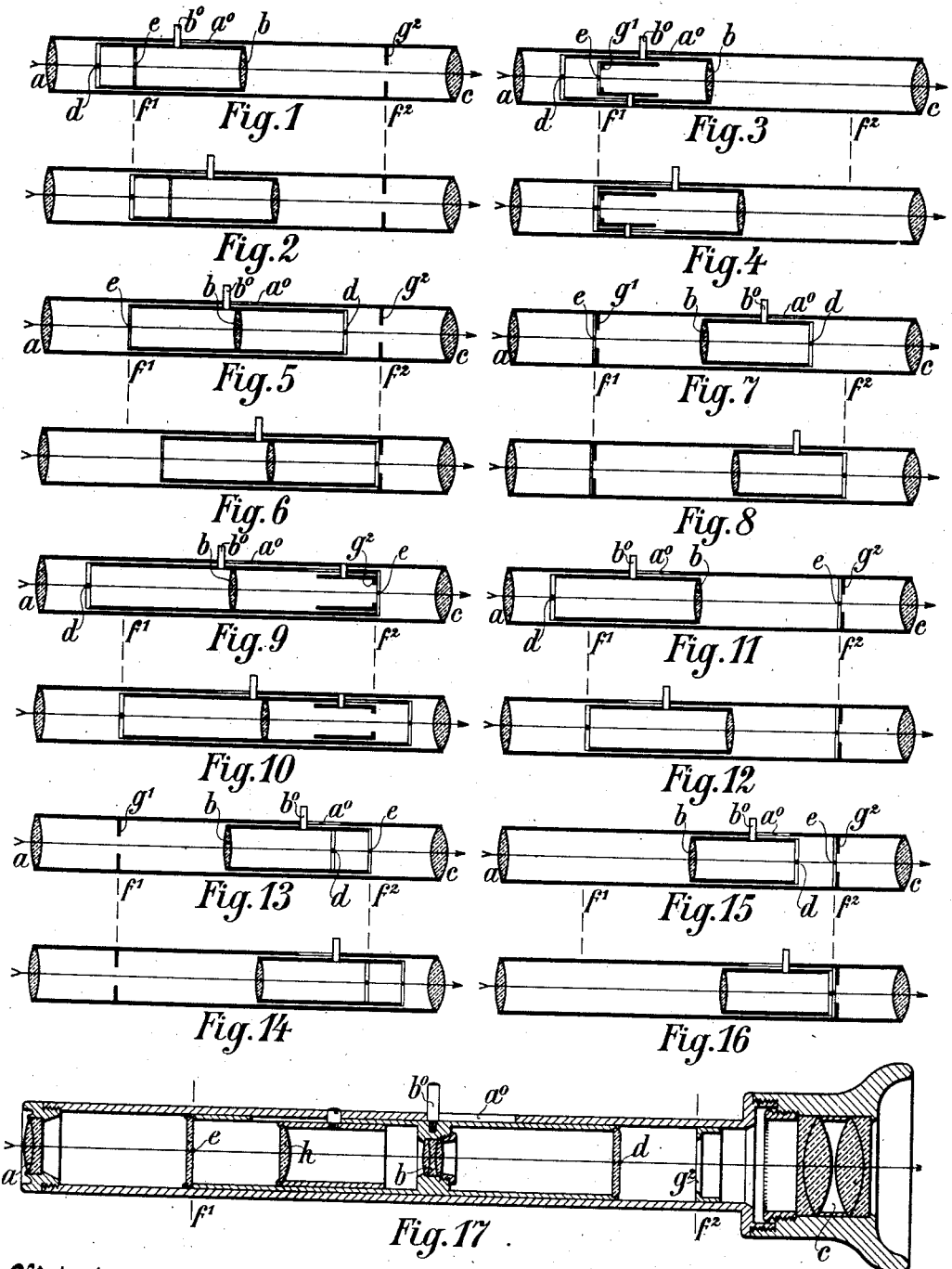

RUDOLF STRAUBEL, OF JENA, GERMANY, ASSIGNOR TO THE FIRM OF CARL ZEISS, OF JENA, GERMANY.

SIGHTING-TELESCOPE.

1,006,699.   Specification of Letters Patent.   Patented Oct. 24, 1911.

Application filed July 5, 1911. Serial No. 636,991.

*To all whom it may concern:*

Be it known that I, RUDOLF STRAUBEL, a citizen of the German Empire, residing at Carl-Zeiss strasse, Jena, in the Grand Duchy of Saxe-Weimar, Germany, have invented a new and useful Sighting-Telescope, of which the following is a specification.

The subject of the invention is a new and more perfect type of the well-known class of sighting telescopes, in which the image projected by the objective is erected by a lens system, a contrivance is provided for changing between two different powers by altering the distances apart of lenses in front of the ocular, and two sighting marks, a coarse one and a fine one, are disposed in such a manner, that with one power the one, with the other power the other mark becomes operative. This class has so far only been realized in one type, in which the marks are fixed the one some distance behind the other and the contrivance for altering the lens distances causes on the one hand a displacement of the objective equal to the distance between the marks, on the other hand a displacement, differing from the former one, of the image-erecting system. By the displacement of the objective the front image plane is shifted from the locus of the one mark to that of the other, the second mark becomes operative instead of the first one, *i. e.* is made distinctly visible. By the displacement of the image-erecting system the change of power is realized and at the same time the shifting of the hinder image plane, corresponding to the shifting of the front image plane, is neutralized. In the new type according to the present invention two lens displacements differng from each other are no longer necessary. The objective retains its locus as does consequently also the front image plane. The contrivance for altering the lens distances in front of the ocular now only acts on the image-erecting system, the displacement of which therefore serves only for the change of power. But the same contrivance also places the two marks alternately into an operative position, *i. e.* removes one mark from an image plane and brings the other into an image plane; or it places the coarse mark into the operative or into an inoperative position, while the fine one has its fixed locus in an image plane. The simplest means for thus placing the marks by the contrivance for changing the power consists in rigidly connecting the pair of marks or the coarse mark, as the case may be, with the image-erecting system. This means is made use of in the constructional examples of the invention, shown in the drawing. These examples further have this in common, that in the case of the low power the coarse mark, in the case of the high power the fine mark is effective. This coordination has, as compared with the reverse one, the advantage, that even when the telescope is of moderate dimensions, still for use in the dusk, where the coarse mark is required, full luminosity of the image observed by the eye is realized.

In the annexed drawing: Figure 1 is a diagrammatic longitudinal section through one form of the sighting telescope constructed according to the invention, the contrivance for changing the power being shown in the one operative position. Fig. 2 is the same section with the above contrivance in the other operative position. Fig. 3 is a section through another form of the above telescope, showing one position of the contrivance. Fig. 4 is the same section with the contrivance in the other position. Fig. 5 is a section through a third form of the above telescope, showing one position of the contrivance. Fig. 6 is the same section with the contrivance in the other position. Fig. 7 is a section through a fourth form of the above telescope, showing one position of the contrivance. Fig. 8 is the same section with the contrivance in the other position. Fig. 9 is a section through a fifth form of the above telescope, showing one position of the contrivance. Fig. 10 is the same section with the contrivance in the other position. Fig. 11 is a section through a sixth form of the above telescope, showing one position of the contrivance. Fig. 12 is the same section with the contrivance in the other position. Fig. 13 is a section through a seventh form of the above telescope, showing the contrivance in one position. Fig. 14 is the same section with the contrivance in the other position. Fig. 15 is a section through an eighth form of the above telescope, showing the contrivance in one position. Fig. 16 is the same section with the contrivance in the other position. Fig. 17 is a section through a constructional form of the third diagrammatic example (Figs. 5 and 6).

The eight examples differ from each other in the relative disposition of the image-erecting lens system and the two sighting marks. In the four left hand examples (the pairs of Figs. 1 and 2, 5 and 6, 9 and 10 and 13 and 14) both marks take part in the displacement, in the four right hand ones (Figs. 3 and 4, 7 and 8, 11 and 12 and 15 and 16) only the coarse mark is displaced. The objective is denoted by $a$, the image-erecting lens by $b$, the ocular by $c$, the coarse sighting mark by $d$ and the fine one by $e$. A pin $b^0$ fixed to the mounting of the lens $b$ and the guide-slot $a^0$ for this pin form the contrivance for altering the lens distances. The front image plane is located at $f^1$, the back one at $f^2$. In each example a diaphragm is fitted and is denoted according as its position is in the front or the back image plane by $g^1$ and $g^2$. The first figure of each pair corresponds to the high power, the second to the low power. In the first figure accordingly only the fine mark is in an image plane, in the second only (in the left hand series) or also (in the right hand series) the coarse one. In the first and last example of either series one and the same image plane receives the mark, in the two middle examples of either series one image plane is the locus of one mark, the other the locus of the other mark.

The constructional example in Fig. 17 differs optically from the diagram according to Figs. 5 and 6 by a fixed collective lens $h$ being disposed near the front image plane $f^1$. The position of the parts corresponds to that of Fig. 5, i. e. the high power and the fine sighting mark are made use of.

I claim:

1. In a sighting telescope an objective, an ocular, an image-erecting lens system, two sighting marks, a coarse one and a fine one, and a contrivance for displacing the image-erecting system so as to change the power, this contrivance being adapted to also change the coarse mark between the operative and an inoperative position.

2. In a sighting telescope an objective, an ocular, an image-erecting lens system and two sighting marks, a coarse one and a fine one, the lens system and the coarse mark being rigidly connected and adapted to be displaced so as to change the power and to change at the same time the coarse mark between the operative and an inoperative position.

3. In a sighting telescope an objective, an ocular, an image-erecting lens system and two sighting marks, a coarse one and a fine one, the lens system and the two marks being rigidly connected and adapted to be displaced so as to change the power and at the same time to change one mark from its operative position into an inoperative one and the other mark from an inoperative position into an operative one.

RUDOLF STRAUBEL.

Witnesses:
PAUL KRÜGER,
RICHARD HAHN.